Sept. 3, 1946.  H. ALLEN ET AL  2,407,050
FLOW WING
Filed April 11, 1942  2 Sheets-Sheet 2
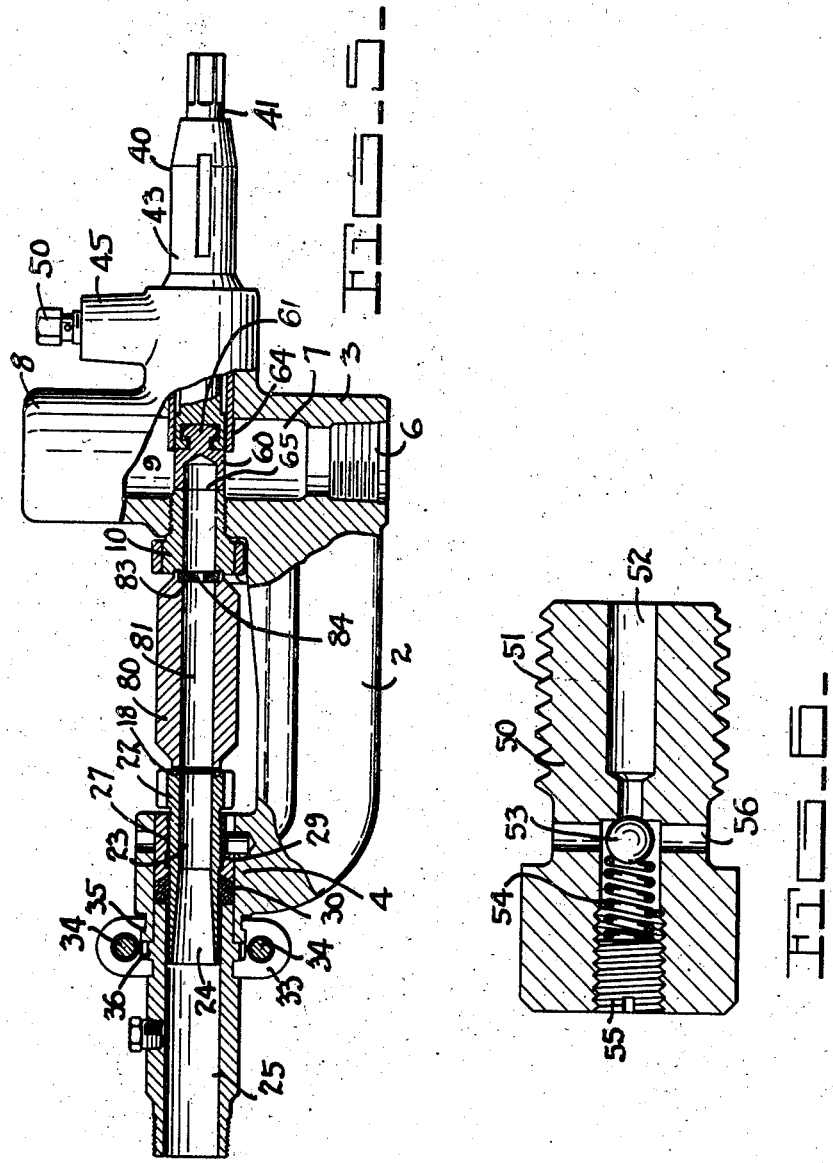
HERBERT ALLEN.
R.N. BEAN
INVENTORS
BY Lester B. Clark
ATTORNEY.

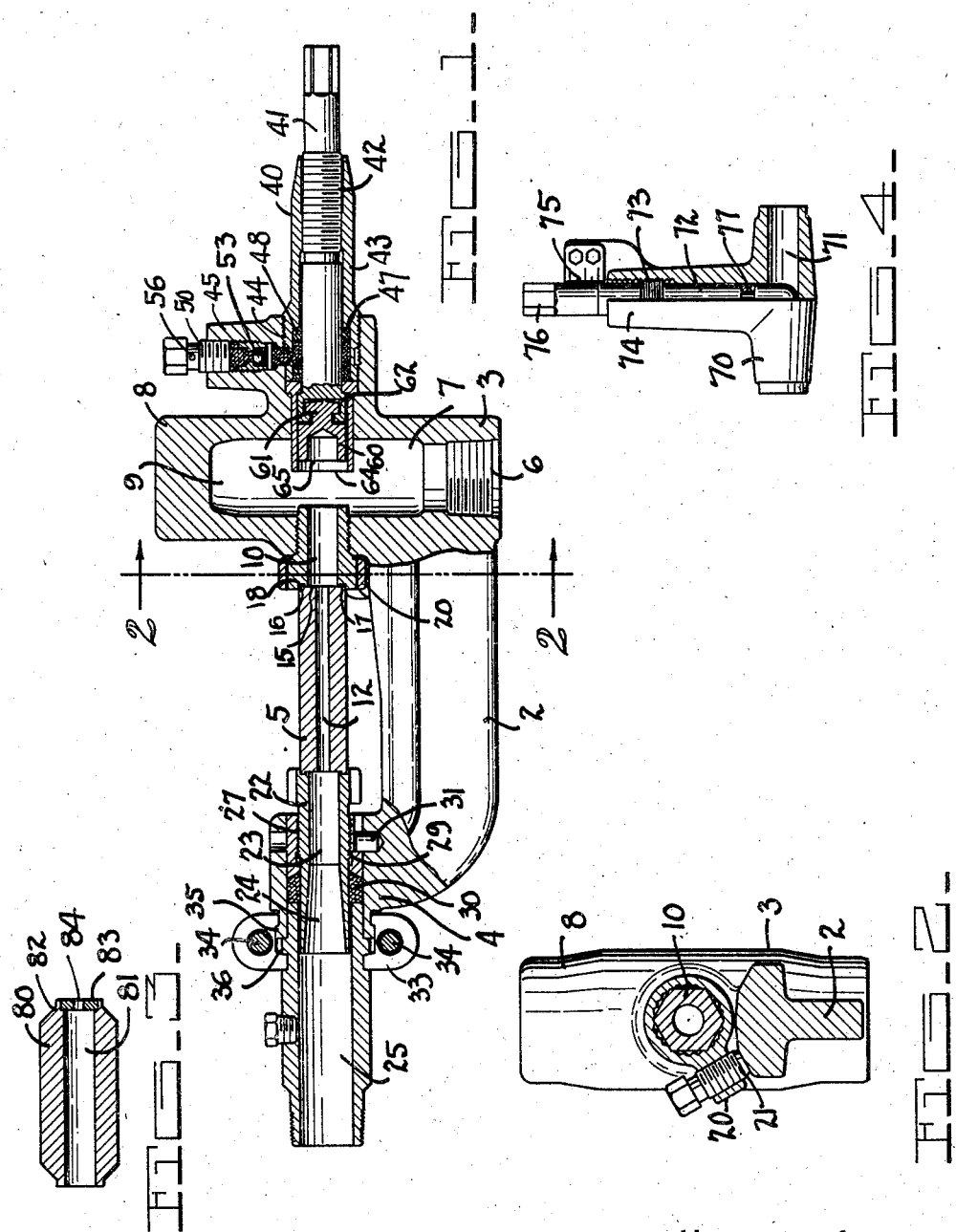

Patented Sept. 3, 1946

2,407,050

UNITED STATES PATENT OFFICE 2,407,050

FLOW WING

Herbert Allen and Ruric N. Bean, Houston, Tex., assignors to Cameron Iron Works, Houston, Tex.

Application April 11, 1942, Serial No. 438,529

7 Claims. (Cl. 138—44)

The invention relates to a flow bean of the type incorporated in a well head fitting in order to control the flow from a well during the washing and completing operations or during the production from the well.

It is not uncommon in the completing and producing of oil and gas wells that the volume of production must be substantially curtailed and in order to govern the volume of such flow, it is necessary to restrict the flow by means of either a fixed or an adjustable flow choke or bean. The present invention therefore is directed to an assembly of parts wherein the flow bean may be readily replaced or adjusted and the flow from the well cut off during such replacement or adjustment.

The invention relates generally to the prior copending application of Herbert Allen, Serial No. 359,825, filed October 5, 1940, for a Combination valve and choke. The present invention relates to various improvements in the body and connecting parts and particularly in the valve and body of the device whereby an entry chamber is provided to minimize turbulence and serve as a cushion chamber for an incoming fluid.

An object of this invention therefore is to provide a structure in which wear due to the erosive action of incoming fluid making a turn within the device will be substantially eliminated.

It is one of the objects of the invention to provide an entry or orifice chamber in a flow wing construction so as to reduce the velocity of flow, avoid wear on the parts and the choke and to minimize the turbulence of the incoming fluid.

Another object of the invention is to provide an adjustable arrangement for flow wings so that the flow bean may be inserted and replaced readily while only temporarily shutting off the flow thru the wing.

Another object of the invention is to provide an assembly valve head and protecting sleeve therefor for use in a flow wing.

Another object of this invention is to provide a packing arrangement which will provide a three-way seal between two tubular members and a support within which they are mounted.

Another object of this invention is to provide a device of the character referred to, a clamp for clamping a flow bean in place and for simultaneously forming a packing about the clamping means.

Still another object is to provide such a packing arrangement in which the packing will be compressed into sealing engagement with the respective parts by the same force with which the flow bean is clamped into position.

Still another object of the invention is to provide a flow wing with an adjustable washing in bean which will permit full flow during the washing operation but which can be closed in or choked down if the well starts to produce or blow.

Another object of the invention is to provide a flow wing with interchangeable beans including a washing in bean and a fixed flow bean so that the well may be washed and then placed on production by merely changing the type of bean in the assembly.

Still another object of the invention is to provide a flow bean with an orifice plate of a particular wear resistant material which will control the volume of flow thru the bean.

Other and further objects of the invention will be readily apparent when the following description is considered in connection with the accompanying drawings wherein:

Fig. 1 is a side elevation of the assembly with a majority of parts shown in section to illustrate the construction thereof.

Fig. 2 is a sectional view taken on line 2—2 of Fig. 1, and illustrating the locking mechanism for holding the valve seat bushing in locked position.

Fig. 3 shows a modified form of flow bean having a wear resistant orifice plate therein.

Fig. 4 is a view partly in elevation and partly in section of an adjustable washing in bean which may be utilized to permit the full flow of the well or to restrict the flow, as desired.

Fig. 5 shows the assembly of Fig. 1 with the bean of Fig. 3 in position and with the valve closed.

Fig. 6 shows a pressure unloading fitting for the valve stem packing assembly.

In Fig. 1 the body or frame is indicated at 2 and it has a head 3 on one end and what may be designated as a tail portion 4 on the other end.

This body 2 is in the form of an arm upon which a head and tail are offset laterally so that the flow bean 5 may be removably mounted between the head and the tail.

The head 3 is provided with an inlet opening 6 which leads into an entry or orifice chamber 7. Particular attention is directed to the fact that the head portion 3 extends upwardly as at 8 so as to form an elongated chamber having an area 9 which provides a dead fluid space to receive the incoming fluid. In this manner a body of the fluid will build up in this chamber and will thus afford a cushioning effect to absorb the velocity of flow of the incoming stream of fluid. In this manner impingement of the fluid against the metal of the body is materially reduced so as to avoid wear on the parts and to provide a body of fluid from which the flow will occur into the outlet bushing 10 which projects into substantially the middle portion of the chamber 7, as best seen in Fig. 1. This arrangement is of particular advantage because the flow will be axially of the bushing 10 from the chamber 7 rather than making a direct turn after entering the chamber into the bushing 10. This has been found to be of material advantage because of the fact that wear occurs in the flow bean, such as 5, rather irregularly and a considerable amount of such wear has been traced to the turbulence of the fluid as it enters the flow bean.

With the present arrangement the flow can be directly from the chamber 7 so that it will pass axially along the bushing 10 and into the flow bean; whereas, if the chamber 7 did not have the extension 9 thereon, the flow would be making a right angle turn into the bushing 10 and be deflected so that it would enter the flow bean possibly at an angle rather than axially of the bean.

The flow bean 5 has the control passage 12 therethru which has been shown as of uniform diameter. The size of this opening 12 controls the volume of flow and various beans having various size openings therein may be introduced or removed relative to the body.

Attention is directed to the fact that the bushing 10 is threaded at 13 into the head so that it can be anchored to receive the end 15 of the bean in the recess 16, particular attention being directed to the fact that the bean member 5 has a small tongue 17 on the end thereof which is arranged to interfit with a groove 19 in the bushing. In this manner a seal is effected and locking ring 20 may be positioned about the bushing 10 and the set screw 21 thereof serves to lock the bushing against turning when the choke is firmly clamped in place.

The opposite end of the choke has a similar tongue and groove arrangement with the flow bean retaining member 22. This member 22 has a passage 23 therethru which is considerably larger than the choke passage 12 thru the bean and is flared at 24 to approximate the size of the connection 25 by which the flow wing is connected to the adjacent pipe.

The choke member 5 is replaceable by adjusting the bushing 22. In order to provide a seal about the bean retainer member 22, a floating gland and packing have been shown at 27 and 30 respectively. This gland is threaded at 29 on the bean retainer member so that such member can be adjusted relative to the gland. The gland in turn is floating on the packing 30 which abuts against the connection 25 in the tail portion 4 of the body 2. This gland 27 is held against rotation by a pin 31 and in this manner the pressure applied by the bean 5 will help to form a seal between the member 22, the tail portion 4 of the body, and the connection 25. A coupling 33 having the connecting bolts 34 serves to clamp the connection 25 to the tail portion 4 of the wing by enclosing the shoulder portion 35 on the tail portion and the flange 36 on the connection.

The valve assembly 40 is carried by the head and includes a spindle 41 which is threaded at 42 in a carrier 43. This carrier is, in turn, threaded at 44 into the extension 45 on the head 3. This carrier 43 has a recess 47 therein which receives a body of plastic packing 48 so as to provide a seal about the spindle. This packing may be replenished from a chamber 49 by being forced into the chamber by the fitting 50. In other words, the chamber 49 can be practically filled with the plastic material and then the fitting 50 inserted therein. This fitting is best seen in Fig. 6 and has the threads 51 by which it is screwed into the extension 45. This fitting has a passage 52 which is normally closed by a check valve 53 urged against its seat by a spring 54 which is in turn held in place by the plug 55. The outlets 56 permit the escape of any material which may unseat the valve 53.

Considerable difficulty has been encountered with plastic packing assemblies of different types because the operator may apply too much pressure to the plastic packing. With the present construction this fitting 50 can be turned in to apply pressure to the packing to feed it about the spindle but if the fitting is turned too far and a pressure is created which exceeds that for which the spring 54 is set, then, of course, the valve 53 will open, permit escape of sufficient material to reduce the pressure, whereupon the spring 54 instantly closes the valve 53. This may be designated as an unloading fitting because it unloads any excess of pressure which may have been applied to the packing.

The spindle 41 carries a valve head 60 which has a flange 61 fitted into the recess 62 in the end of the spindle. The flange is inserted into the recess by sliding it laterally until it moves into alignment with the spindle 41. In this manner the valve member or valve head can be readily replaced in event of wear. In order to prevent this head from becoming dislodged during operation a guide sleeve 64 is carried by the head and receives the end of the spindle and the valve head, as best seen in Fig. 1. The valve head has a seating face 65 which will abut the end of the bushing 10, as seen in Fig. 5, when the valve is moved to closed position. This sleeve 65 also serves to protect the valve head against wear due to the flow of incoming fluid and to otherwise protect the valve head.

When the flow is to be shut off for any reason or the bean 5 to be repaired or replaced, it is only necessary to close the valve 60 to shut off the flow.

It seems obvious that a suitable size bean 5 may be used to produce the volume desired from the well. When the assembly is first applied to the well, as a usual rule the well has not been completed and is often filled with drilling mud which must be washed from the well. In the washing operation a full flow from the well is desirable so as to wash out the undesirable liquids or fluids in the well. On the other hand control of the well is very essential at this period of its completion because if water or oil is being used to wash the well it is usually of a lesser specific gravity than the mud and the well may start to blow in when the formation pressure overcomes static pressure of the column of liquid in the well. If the full flow is being permitted from the well a suitable control device must be present to shut in the well or reduce the flow in event it begins to blow. To accomplish this a modified form of bean is shown in Fig. 4 and this bean is known as a washing in bean or an adjustable bean and includes a body 70 having a passage 71 therethru which can be varied in size by a plunger 72. This plunger is threaded at 73 into the extension 74 and may have an indicating device 75 thereon so that the position of the plunger will be known. This plunger can be turned by engaging the non-circular portion 76 thereof and is sealed against leakage by the packing 77. This bean can be used interchangeably with the bean 5 of Fig. 1 during washing in operation.

When the bean is to be replaced or changed, it is only necessary to close the valve 60, loosen the bushing 22 and replace the bean.

Fig. 3 shows another form of bean 80 having an enlarged passage 81 therethru but one end of the bean has a recess 82 which is arranged to receive an orifice plate 83 of a suitable brittle or hard wear resistant material such as Stellite. This plate has an orifice 84 therein the size of which will govern the volume of flow.

Broadly the invention contemplates a flow bean or wing which can be readily inserted or removed and in which the various beans can be replaced or adjusted while maintaining control over the flow from the well.

What is claimed is:

1. In a flow wing having a body, a flow bean retainer carried thereby, and means to adjustably support and position said retainer in the body including a floating gland and packing, said gland being threaded to said retainer and slidably but non-rotatably mounted in said body and abutting said packing.

2. A washing-in flow bean comprising a body having the length of a standard flow bean and means at its ends to be received into a standard flow bean holder, said body having a flow passage therethrough and a lateral opening into said flow passage intermediate its ends, and of substantially the same diameter as said flow passage, a stem of a size to fit within said opening and having an end comprising a surface of revolution coaxial with said stem and of a longitudinal cross section adapted to substantially seat against the wall of said flow passage opposite said opening, and means for adjusting the position of said stem to project into said flow passage a greater or a lesser amount.

3. A washing-in type flow bean comprising a body of a length corresponding to the length of a standard flow bean and having a flow passage therethrough and a lateral opening of substantially the same diameter as said flow passage intersecting the flow passage intermediate its ends, and a stem threaded into said opening and having a hemispherical end portion adapted to project into said passage a greater or a lesser amount to provide a desired restriction in said passage.

4. In a flow wing having a body, a flow bean retainer slidably carried thereby, and means to adjustably support and position said retainer in the body including a floating gland and packing, and means adjustably connecting said gland and retainer whereby movement of the retainer with respect to the gland to engage a flow bean will produce a reactive movement of the gland to tighten said packing.

5. In a flow wing having a body, an outlet connection and a flow bean retainer carried by the body in telescoping relation therewith, a packing interposed between the body, the outlet connection, and the retainer, and means for tightening said packing to form a three-way seal between said body, said connection and said retainer.

6. In a flow wing having a body, a flow bean retainer carried thereby, and means to adjustably support and position said retainer in the body including a floating gland and packing, key means connecting the gland and body providing for axial movement of the gland relative to the body, and means adjustably connecting said gland and retainer whereby movement of the retainer with respect to the gland to engage a flow bean will produce a reactive movement of the gland to tighten said packing.

7. In a flow wing having a body, a flow bean retainer carried thereby, and means to adjustably support and position said retainer in the body including a floating gland and packing, means providing for axial movement of the gland relative to the body and preventing relative rotation therebetween, and means adjustably connecting said gland and retainer whereby movement of the retainer with respect to the gland to engage a flow bean will produce a reactive movement of the gland to tighten said packing.

HERBERT ALLEN.
RURIC N. BEAN.